United States Patent Office 3,551,885
Patented Dec. 29, 1970

3,551,885
VALIDITY APPARATUS FOR COMPUTER BASED PROCESS CONTROL EQUIPMENT
Russell A. Henzel, Sudbury, Mass., assignor to Honeywell Inc., Minneapolis, Minn., a corporation of Delaware
Filed Jan. 18, 1968, Ser. No. 701,527
Int. Cl. H04g 9/00; G08c 25/00
U.S. Cl. 340—146.1       15 Claims

ABSTRACT OF THE DISCLOSURE

Monitoring apparatus for computer-based process control systems detects and reports invalid operations, including the erroneous addressing of stations, transmission of data, and instruction of stations, and inhibits further response to a recognized error condition. Data errors are detected by comparing the data arriving at a station with a complementary function of the data sent to the station. Invalid codes of address and instruction signals signify errors of these functions.

INTRODUCTION

This invention relates to the detection and reporting of errors in automatic process control equipment. It also provides apparatus for terminating erroneous operation.

Automatic process control involves the application of computers to the control of physical processes such as the manufacturing of chemical compounds, the baking of bread, the refining of steel and petroleum, and the generation and distribution of electric power. Valves are typical final control devices that effect the actual control on the process. A computer operates the valves, typically by way of a separate station for each valve, in accordance with stored instructions and the monitored state of the controlled process. The computer can, for example, service each valve in sequence to adjust its position. The time between successive "adjusts" of a given valve can be less than a second where necessary, and considerably longer for other valves controlling slower steps in the process.

Erroneous operation of an automatic process control system is to be avoided, for it can result in an inferior or even worthless product from the process. In extreme cases a malfunction or operator error can result in catastrophic explosion.

More specifically, malfunction in a process controlling computer system can affect the entire process because the computer system operates many, e.g. several hundred or more, valves on a time shared basis. Hence a computer system malfunction can upset each valve the computer thereafter services. When a larger number of valves are thus upset, it is extremely difficult for the human operator to restore proper process operation.

One way to achieve the requisite reliable operation is to provide redundant, backup, equipment that becomes operative when erroneous operation of the parallel main piece of equipment is reported. However, the redundancy solution is costly to implement. Further, it is dependent upon the error detecting equipment. In addition, it often requires considerable additional switching equipment to transfer operation to the redundant equipment.

Another prior art approach to monitoring involves the use of a "dummy" station whose output is fed back to the computer rather than to a valve. When the computer operates the dummy station, it looks for the appropriate signals to return from it. If this dummy test is satisfactory, the computer continues operating the process controlling stations. Principle disadvantages of this test are that it does not monitor the actual operation of the process controlling stations and it leaves many system components unchecked. Further, faults arising after one dummy check will result in erroneous setting of all valves serviced before the next dummy check recognizes the fault. Frequent dummy checks to alleviate this defect are undesirable because they require too much time.

A general object of the invention is to provide improved automatic process control equipment, particularly of the DDC (direct digital control) type.

A further object is to provide automatic process control equipment characterized by improved capability to maintain valid operation of a controlled process in the event of varied errors, including equipment malfunctions and programming errors.

Another object of the invention is to provide improved apparatus for detecting erroneous signals in automatic process control equipment. Further objects are to provide such error detecting apparatus that monitors actual operations of the stations.

It is also an object of the invention to provide improved apparatus for terminating operation of automatic process control equipment in response to error-identifying signals.

A further object of the invention is to provide apparatus of the above character that operates with relatively simple logic and hence with relatively little hardware.

Other objects of the invention will in part be obvious and will in part appear hereinafter.

The present invention attains the foregoing objective, and solves the problems mentioned above, by providing error-detecting apparatus, for a computer-based process control system, which monitors the actual operating signals crossing the interface from the time shared to the non-time shared portions of the system, and in that direction. The apparatus monitors the signals on a continuous basis, and detects both equipment malfunctions and signal code, or programming, errors.

Further, the error-detecting apparatus reports errors with sufficient speed to allow the operator time to correct any erroneous control operations and maintain the process within operating limits. Hence, process control systems embodying the invention generally suffer no loss of material in process due to errors or malfunctions. The invention achieves these results without the need for ultrareliable components and without the need for redundant time-shared equipment.

SUMMARY OF THE INVENTION

The illustrated control system embodying the invention is a direct digital control type of system in which a computer operates with a large number of control stations one at a time through an interface unit. The system is organized to have few connections between the interface unit and the stations, for they are typically widely separated. Each station contains the circuits for operating one process control device, typically some kind of valve, in response to computer-originated signals the station receives via the interface unit. However, where desired, the operator can set each station to maintain its valve at a selected condition.

The stations are organized into groups, and address signals from the computer are channeled only to the single group containing the station to be serviced. In accordance with one feature of the invention, the application of address signals simultaneously to more than one station group is sensed as a "multigroup" error. Within each group of stations, either conflicting instruction signals or an invalid address signal code develops a "function" error condition.

Another feature of the invention is the provision of novel equipment for testing the circuits that apply a data signal to the stations in response to digital data signals in the computer. The data signal is sent out by the computer for use by an addressed station to adjust its associated valve. In accordance with the invention, the data signal received at the addressed station is returned to the central location and applied to one of two inputs of an electrical comparing device. The other comparing device input receives a signal that corresponds to a complementary function of the data signal developed in the computer. In the event that the compared resultant of the two signals thus applied to the comparing device exceeds a selected value, a "data error" is identified. To discount errors produced by disturbances such as noise, corrective action responsive to the data error signal can be produced only after a selected number of successive comparisons produce out-of-limit resultants.

The foregoing arrangement has been found to provide a thorough error check in automatic control systems, particularly in DDC systems. It locates both equipment malfunctions and programming mistakes. Yet this validity system requires little hardware and operates with sufficient speed to maintain relatively safe and stable operation of the controlled process.

In addition, the error check examines all digital and analog circuits in the data path between and including the data register in the computer and the data input terminals to the addressed station. Where desired, the actual response of the station to the data signal can be monitored with a feedback type signal.

The invention accordingly comprises the features of construction, combinations of elements and arrangement of parts exemplified in the constructions hereinafter set forth, and the scope of the invention is indicated in the claims.

BRIEF DESCRIPTION OF FIGURES

For a fuller understanding of the nature and object of the invention, reference should be had to the following detailed description, taken in connection with the accompanying drawings, in which.

SPECIFIC DESCRIPTION OF ILLUSTRATED EMBODIMENTS

Figure 1:
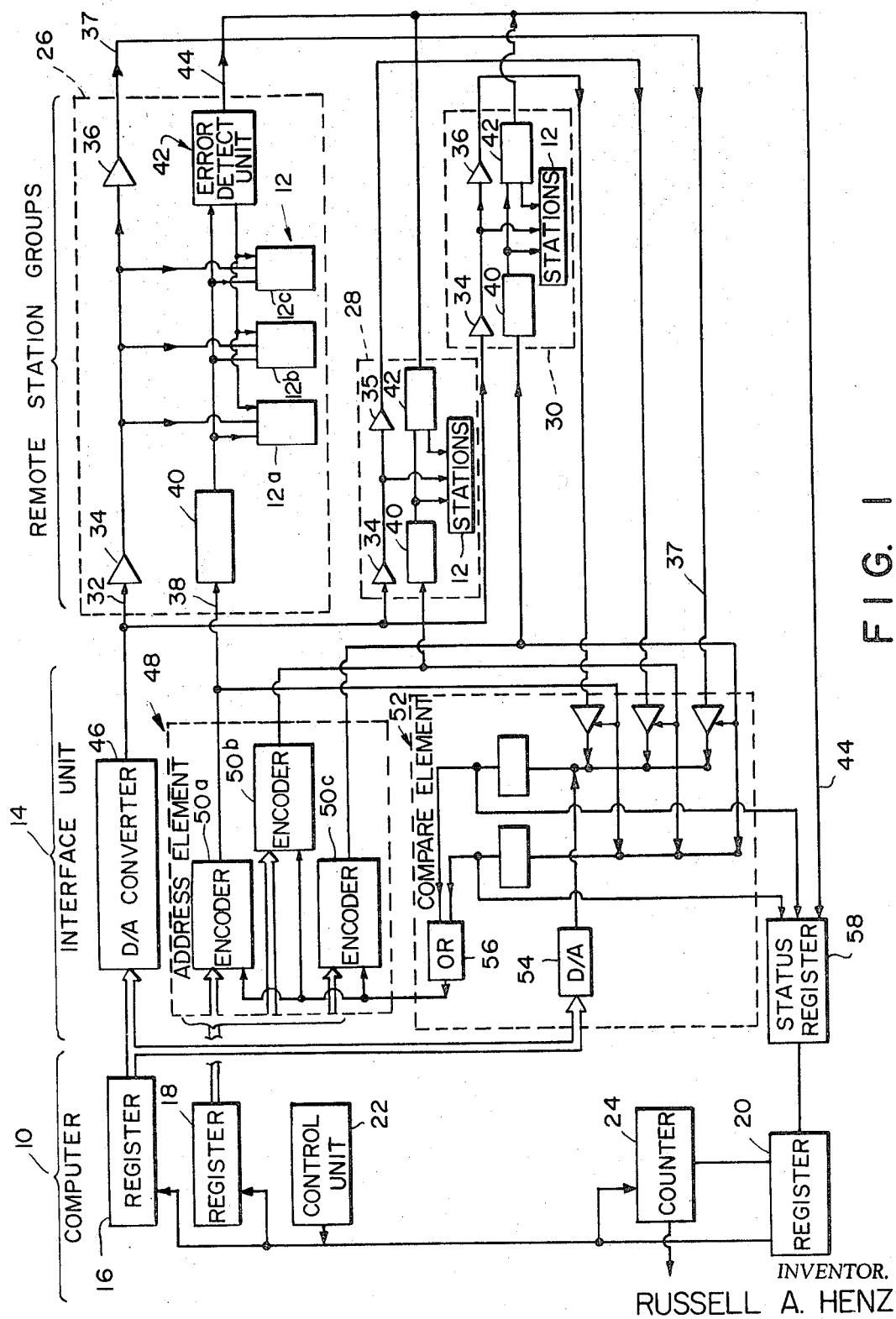
FIG. 1 is a block schematic representation of a direct digital control system embodying features of the invention.

FIG. 1 shows a direct digital control system having an electronic digital computer indicated generally at 10 and numerous stations 12, each of which operates a valve or like final control device. The stations are connected to the computer by way of an interface unit 14.

As indicated, the computer 10 includes a data register 16 and an address register 18, each arranged to apply digital information stored therein to the interface unit 14. In addition, register 20 is arranged to receive digital information from the interface unit. A control unit 22 in the computer is connected to control the operations of the registers 16, 18 and 20, as well as that of an optional counter 24 arranged to count signals it receives from the register 20.

With further reference to FIG. 1, the stations in the illustrated control system are organized into three groups 26, 28 and 30. For simplicity, each has only three stations, such as the stations 12a, 12b and 12c in group 26. In actual practice a control system generally has significantly more groups of stations and significantly more than three stations per group.

Considering the station group 26, typical of the other groups, in further detail, a data signal reecived on conductor 32 is applied to a buffer amplifier 34, the output from which is applied in parallel in each station 12a, 12b, 12c in the group. The data signal is then applied to another buffer amplifier 36 from which the signal is returned to the interface unit 14 for further processing that details data error.

The station 26 receives address and instruction signals, jointly termed "function" signals, from the interface unit 14 on plural conductors 38, only one of which is shown. Buffer logic 40, where needed, shifts the levels of these signals according to the requirements of the stations 12, to which the signals are then applied in parallel. The function signals are also applied to an error detection unit 42. This unit develops, when function signals violate a selected code, a function error condition in which a disabling signal is applied to each station 12a, 12b and 12c in group 26 and in which a function error signal is applied to conductor 44 for return to the computer by way of the interface unit 14.

It will thus be seen that each illustrated station 12 receives, in common with all other stations within the group thereof, one or more data signals, and address and instruction signals; it also receives a disable signal in the event and erroneous address or instruction signal is received at the group.

Two instruction signals will be considered in detail. One is an "update" instruction that operates the enabled station to accept the data signal and adjust the valve to which it is connected in response. The other is a "feedback" instruction that operates the enabled station to send the computer, via the interface unit, a signal identifying the position at which the station is maintaining its valve.

FIG. 1 also shows that the illustrated interface unit 14 has a digital-to-analog converter 46 that receives digital most often binary, data signals from the computer register 16 and produces in response a corresponding analog data signal that is applied via conductor 32 to the station group 26, and is also applied to the station groups 28 and 30.

The interface unit 14 also has an address element indicated generally at 48, illustrated as having one encoder 50a, 50b and 50c for each station group. This element receives the binary address and instruction (i.e. function) signals from the computer register 18. These signals are applied in parallel to the several encoders 50 and activate one to produce corresponding address and instruction signals having a selected code. These function signals from the active encoder are applied to the buffer logic 40 in the one associated station group 26, 28 and 30, as indicated.

As also shown in FIG. 1, a compare element 52 in the interface unit 14 receives the data signals returned from the station group, such as the data signal which the group 26 applies to the conductor 37. It also receives update instruction signals that cause addressed stations to process the data signal. In addition, the compare element receives the complement of the digital data signal the computer register 16 applies to the converter 46. A digital-to-analog converter 54 converts these complement digital data signals to an analog signal that is compared with the data signal return from the addressed station. When the resultant of this comparing operation is outside specified limits, the comparing unit 52 develops a data error signals. This signal is applied through an OR circuit 56 to terminate the output signals from the address element 48, thereby disabling all stations from responding to the erroneous data signal. The digital-to-analog converter 54, and the converter 46, preferably includes a register for storing the binary signals received from the computer 10.

Further, when the compare element 52 receives more than one update instruction signal at a time, it develops a multigroup error signal. This error signal also is applied to the OR circuit 56 to disable all the station from responding to the erroneous signals.

Another element of the FIG. 1 interface unit 14 is a status register 58 that receives the function error signal produced in any station group 26, 28 and 30, and the data error and multigroup error signals produced in the compare element 52.

The computer control unit 22 causes these signals to be transferred to the computer register 20, as desired.

As noted above, the analog data signal from the interface unit 14 is applied to all the stations. The address signals enable a single station, and when that station also receives an update instruction signal it adjusts its associated valve in response to the data signal.

More particularly in a typical computer sequence for one valve-servicing cycle, the computer 10 successively operates the register 16 to apply binary data signals to the converter 46 in the interface unit, operates the register 16 to apply the one's complement of the data signals to the converter 54 in the compare element 52. Thereafter, the register 18 is operated to apply binary function signals, i.e. station address and instruction signals, to the address element 48. The computer 10 can have many forms, and can have a single register providing the operations of both registers 16 and 18.

Figure 2:
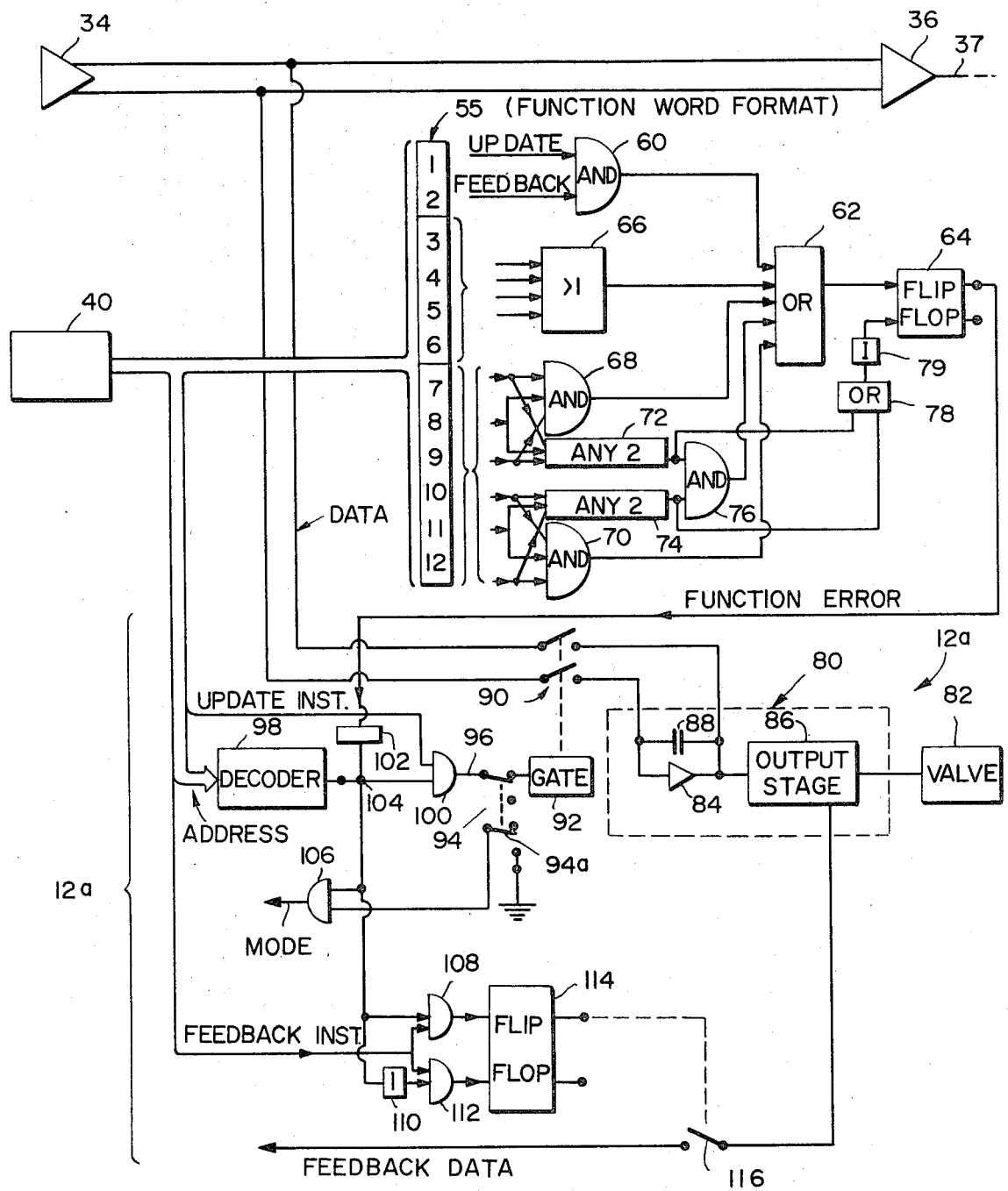
FIG. 2 is a schematic representation of a station for use in the system of FIG. 1, shown with additional circuits in the station group.

In an illustrative system, the address and instruction signals from the interface unit address element 48 form a twelve-bit function word being an instruction field, and two address fields, indicated at 55 in FIG. 2. The instruction field consisting of bits numbered 1 and 2 for example, is valid only when one bit therein is True. The first address field has four bits, numbered three through six, and is valid only when one of the four bits is True. The second address field in bits seven through twelve of the function word is valid when only three bits therein are True and, further, when no more than two of the three True bits are in either half of the field.

This form of function word has the advantage that it requires fewer logic elements in the station groups than a word coded with conventional binary logic. It should be noted that should any one of the three fields in this function word have less than the specified number of True signals, the station group will not respond to the word. The stations readily report this type of error with a drop-out indicator that becomes active whenever a station is not serviced within a specified time.

FIG. 2 shows, at the top, further structure of the error detection unit 42 in the station group 26. The lower portion of the drawing shows additional structure of the station 12a in that group. The other stations in the group 26, and in the other groups are preferably similarly arranged.

The error detection unit 42 develops the function error signal when the function word received from the interface unit 14 of the FIG. 1 has an invalid code. With the illustrated function word, the unit 42 reports a function error when both the update and feedback bits are True, or when more than one of the four bits in the first address field are True, or when the second address field has more than three True bits or has more than two True bits in either three-bit segment thereof.

The unit 42 is illustrated as constructed with two-input coincidence circuit 60 that receives the two instruction signals, i.e., update and feedback, of the function word. When both of these signals are True simultaneously but at no other time, the circuit develops an error-indicating output signal that is applied through an OR circuit 62 to switch a flip-flop 64, to the set condition. The output signal from the flip-flop, when in the set condition, is the function error signal.

A logic network 66 in the error detection unit 42 receives the four address signals that constitute the first function word address field described above. This network, suitably constructed with two-input coincidence circuits having their output terminals OR'd together, responds to the receipt of more than one True input signal to operate the OR circuit 62 to set the flip-flop 64, thereby producing the function error signal.

As also shown in FIG. 2, the three address signals that make up one half of the six-bit second address field of the function word are applied both to a three-input coincidence circuit 68 and to a logic network 72. The three signals constituting the other half of the second address field likewise are applied to a three-input coincidence circuit 70 and to a logic network 74. Each coincidence circuit 68, 70 applies to the OR circuit 62 an output signal that sets the error flip-flop 64 only when that coincidence circuit receives three True input signals. Each logic network 72 and 74, readily constructed with two-input coincidence circuits, responds to the receipt of two or more True input signals to enable a two-input coincidence circuit 76. When both inputs of this circuit 76 are thus enabled, it likewise develops an output signal that operates the OR circuit 62 to set the error flip-flop 64.

As shown further in FIG. 2, the output signal from each logic network 72 and 74 is also applied to the two inputs of an OR circuit 78 whose output signal is inverted in an inverter 79 and then applied to the reset input of the error flip-flop 64. The OR circuit 78 and inverter 79 are thus activated to reset the flip-flop 64, thereby removing the function error signal, in response to the coincident receipt of the signals the logic networks 72 and 74 produce when each receives fewer than two True input signals. The FIG. 1 computer 10 is preferably operated to cause the FIG. 1 address element 48 to develop the six address signals in the second address field of the function word to be all False immediately prior to each new operation with a station. Hence it is at this time that the logic network 72 and 74 operate the OR circuit 78 to reset the flip-flop 64 and thereby remove any function error signals developed during the preceding station-servicing operation.

Turning to the station 12a in FIG. 2, it has an amplifier 80 whose output signal operates a valve 82 (not part of the station) to control a process in the desired manner. The illustrated amplifier 80 has an amplifier stage 84 driving an output stage 86, and a storage capacitor 88 is connected across the stage 84.

When the FIG. 1 computer 10 operates to apply data to the station 12a, the data signal is applied from the FIG. 1 interface unit 14 to the buffer amplifier 34 in the station group 26; this amplifier and the other buffer amplifier 36 in the station group area shown at the top of FIG. 2. The data signal is applied across the capacitor 88 by an update switch 90 illustrated as an elementary double-pole, single-throw switch in series between the amplifier 34 output and the capacitor and constructed, for example, with field effect transistors or with relays. A gate 92 operates the update switch 90.

To enable the operator to select whether the station 12a is to be controlled by the computer rather than manually, a mode switch 94, often manually operated, is in series with the input to the gate 92. More specifically, the mode switch is preferably a form of double-pole, double-throw switch, when switched to the manual position from the computer position shown, one pole interrupts the gate 92 input signal and the other pole is grounded.

The manner in which the signal, on conductor 96, which operates the gate 92 is developed will now be described with further reference to FIG. 2. A decoder 98 receives the address signals from the input buffer logic 40 of the station group 26. When these signals have a selected combination of values uniquely associated with the station 12a, the decoder 98 produces an output signal that partially enables a coincidence circuit 100. The other input signal to this coincidence circuit is the update signal output from the buffer logic 40. Thus, the coincidence circuit 100 is actuated to operate the update switch gate 92 only when the decoder 98 receives address signals identifying the station 12a and when the update signal is present.

However, when the function error signal developed with the flip-flop 64 (upper half of FIG. 2) is present, a buffer gate 102 to which this error signal is applied clamps the output of the decoder 98 to an inactive level, thereby disabling the gate 100 from responding to the update signal. In this manner, the function error signal terminates the response by the station 12a to the erroneous condition, be it an address error or an instruction error, which causes the function error signal.

To signal the computer (FIG. 1) when the station operator has placed the mode switch 94 in the position for manual station operation, the pole 94a of this switch is connected to one of two inputs on a coincidence circuit 106. This coincidence circuit is enabled by the signal developed at terminal 104 when the station is addressed and no function error signal is present. Thus, when the station 12a is addressed and no function error is indicated, the output signal from the coincidence circuit 106 identifies the condition of the mode switch 94; this output signal is conveniently OR'd with the corresponding signals from other stations and the resultant signal fed back to the computer by way of the interface unit of FIG. 1.

The signal at terminal 104 is also applied to one of two inputs of a coincidence circuit 108 and, after inversion with an inverter 110, to an input of a two-input coincidence circuit 112. The other input signal to each coincidence circuit 108 and 112 is the feedback instruction signal that forms part of the function word output from the buffer logic 40.

The coincidence, at the inputs to the coincidence circuit 108 of the feedback instruction signal and the signal produced when the station is addressed, causes the coincidence circuit to set a flip-flop 114. When in this condition, the flip-flop output signal closes a feedback switch 116 to apply to the computer, by way of the interface unit, a "feedback data" signal corresponding to the signal station amplifier 80 applies to the valve 82.

Thus, when the computer addresses the station 12a and causes a feedback instruction signal to be applied to it rather than an update instruction signal, the station response is to close the switch 116 and thereby apply to the computer a signal identifying the station output signal being applied to the valve 82.

The flip-flop 114 is reset, to open the switch 116, in response to the coincident application to the coincidence circuit 112 of the feedback instruction signal and the signal developed at terminal 104 either when the station 12a is not addressed or when the station receives a function error signal from the flip-flop 64.

As described above with reference to FIG. 1, the comparing element 52 develops the data error signal when the data signal applied to the stations does not correspond correctly with the data stored in the computer register 16. Also, the element 52 develops a multigroup error signal when the addressing element 48 in the interface unit delivers an update signal to more than one group of stations.

This operation is now described with reference to FIG. 3, which shows the interface unit addressing element 48 and comparing element 52. The comparing element has a buffer amplifier 120 that receives the data signal returned to the interface unit from the station group 26; in particular it receives the data signal which the buffer amplifier 36 in that station group applies to conductor 37. The amplifier 120 includes a normally-open switch 122 in its output path. A True value of the group 26 update instruction, from the addressing element 48, is applied to the switch on conductor 124 to close the switch.

The comparing element 52 has a similar buffer amplifier 126 that receives the data signal returned from the buffer amplifier 36 in the station group 28 and a further amplifier 128 that receives the data returned to the interface unit from the amplifier 36 in the station group 30. Similarly, a normally-open output stage switch 130 in the amplifier 126 closes in response to a True update signal directed from the interface unit addressing element 48 to the station group 28. A True update signal for station group 30 is similarly applied to the amplifier 128 to close a normally-open output switch 132 therein. The output switch in each amplifier 120, 126 and 128 can, for example, be constructed with a field effect transistor or with a relay.

Figure 3:
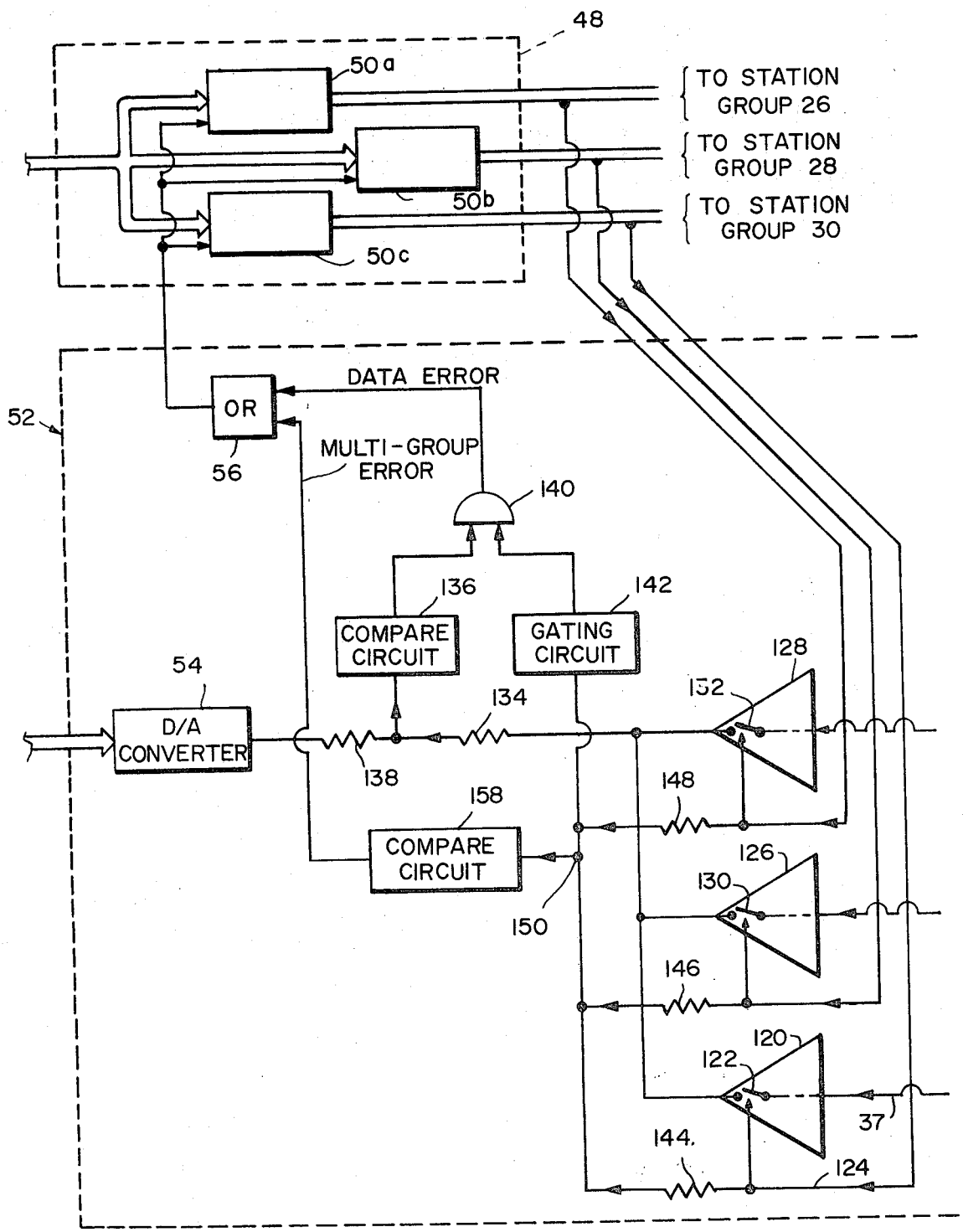
FIG. 3 is a schematic representaion of data error and multiple group error detecting circuits for the system of FIG. 1.

With further reference to FIG. 3, the output signal from each buffer amplifier 120, 126 and 128 is applied in parallel to a summing resistor 134 connected at its other end to the input terminal of a differential amplifier 136 or like comparing device.

As described above, the comparing element 52 has as digital-to-analog converter 54 that is operated with the computer register 16 of FIG. 1 to receive the ONE's complement of the digital data the computer applies to the digital-to-analog converter 36 in the interface unit 14 of FIG. 1. The analog signal the converter 54 develops in response to the complemented digital data signals is applied through a resistor 138 to the amplifier 136.

The amplifier or compare circuit 136 thus receives the arithmetic analog sum of the complementary data signal applied to the summing resistor 138 and the data signal returned from the addressed station group and applied to the summing resistor 134. When this resultant signal is within a selected margin of zero, the comparing amplifier develops no significant output signal, which indicates not data error is present. However, when the summing network formed by resistors 134 and 138 applies a larger signal to the amplifier 136, as results from a fault in any circuit processing the data signal or its complement, the amplifier output has a selected value that enables a coincidence circuit 140. This reference to circuits processing the data signal or its complement includes the computer register 16, as well as circuits in the interface unit 14 and the station groups and back to the resistor 134, and the signal path from the register 16 to the digital-to-analog converter 54 and on to the other summing resistor 138.

When thus enabled, in response to a timing pulse a gating circuit 142 applies to the other input of the coincidence circuit 140, it develops the data error signal. This error signal operates the OR circuit 56 shown in FIG. 1 to cause the addressing element of the interface unit to terminate the function signals being applied to a station group, as described hereinabove with reference to FIG. 1.

The gating circuit 142 develops the timing pulse for gating the coincidence circuit 140 when one or more True update signals is present. The circuit initiates the pulse a brief delay after it senses the True update signal. In particular, each update signal applied to the amplifiers 120, 126 and 128 is applied also through an isolating resistor 144, 146 and 148 respectively to a terminal 150 to which the input of the gating network is connected. The potential at the terminal 150 is thus an additive function of the values of the update signals. It is at a reference level when no update signals are True and becomes increasingly positive, for example, as the number of True update signals increases. The gating circuit 152 thus produces the timing pulse in response to the transition of the potential at the termnal 150 from the reference value corresponding to no True update signals to the more positive potential that results when at least one update signal is true.

With this arrangement in the illustrated system, the comparing element 52 develops a data error signal only when the data returned to it from the stations does not correspond to the complement data from the computer data register 18 (FIG. 1) during a brief time interval selectively delayed after application of the update signal to the station groups. The delay is desired to allow the signals being compared to settle to their final values before the comparison is sensed.

With further reference to FIG. 3, the potential at the terminal 150, corresponding to the number of True update signals, is applied also to further differential amplifier 158 or other comparing device whose output signal is the multigroup error signal mentioned above. This amplifier 158 has a threshold such that it develops a signal recognized as the multigroup error signal only when two or more update signals are True simultaneously. This error signal is applied to OR circuit 56 as described above with reference to FIG. 1.

In review, described above is novel equipment for monitoring the operation of an automatic process control system on an essentially continuous, operation-by-operation, basis. The equipment detects errors, and develops a signal identifying each detected error. These signals also are readily used to terminate response to the erroneous condition.

The equipment operates substantially automatically without requiring signals from the computer or other external devices other than those signals used in the actual process control operation. The only exception is the delivery to the interface unit of the complement of the digital data sent to the stations. But this is a desired operation because it forces all binary stages in the computer register 16 to change state, and thereby develop the complement signal, before the system proceeds to the next station-service cycle.

It will thus be seen that the object set forth above, among those made apparent from the preceding description, are efficiently attained and, since certain changes may be made in carrying out the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Multiple-station automatic process control apparatus comprising:
   (A) central data processing means including
      (1) means for computing information signals for operating individual process control stations,
      (2) means for both receiving information signals from said stations and for delivering said computed information signals to said stations, and,
      (3) means for developing address signals identifying said stations and for developing at least first and second instruction signals, and
   (B) a first plurality of process-control stations electrically coupled with said central data processing means so that all said stations receive said address signals, said instruction signals and said computed information signals, each of said first plurality of process-control stations including
      (1) means for responding to said instruction signals only when one of said stations receives a selected address signal,
      (2) means for activating one of said stations to operate a process-controlling element associated therewith in response to information signals applied thereto, when said one of said stations responds to said first instruction signal, and
      (3) meas for activating one of said stations to deliver to said central data processing means information signals corresponding to the operation of said associated process-controlling element, when said one of said stations responds to said second instruction signal.

2. Apparatus as defined in claim 1 further comprising error-detecting means in circuit with said instruction signals delivered to said stations, and arranged to develop an error-indicating output signal when both said first and second instruction signals are delivered to said stations coincidentally.

3. Apparatus as defined in claim 2 in which said stations are connected with said error-detecting means and are arranged to terminate response to said instruction signals when said error-indicating signal is present.

4. Apparatus as defined in claim 2 further including means for allowing said computed information signals to activate one of said stations to operate a process-controlling element associated therewith only when said error-indicating signal is absent and said first instruction signal and corresponding address signal are present.

5. Apparatus as defined in claim 1 further including error-detecting means comprising
   (A) means for receiving a first signal corresponding to said computed information signal received at said first plurality of process-control stations,
   (B) means for receiving said computed information signal from said central data processing means, and
   (C) means for comparing said first signal and said computed information signal from said central data processing means and developing an error-indicating signal when the resultant of said comparison exceeds a selected value.

6. Apparatus as defined in claim 1 wherein
   (A) said means for responding further comprises monitoring means in circuit with said address signals applied to said stations and arranged to develop an error-indicating signal when it receives address signals having other than a selected code, and
   (B) said first plurality of process-control stations further comprises means for disabling delivery of said computed information signals to said stations when said error-indicating signal is developed.

7. Apparatus as defined in claim 6 wherein
   (A) said address signals include first and second address fields, said first field including a first plurality of address bits and said second field including a second plurality of address bits, and wherein
   (B) said error-indicating signal is developed when a selected combination of said address bits are in a true state.

8. Apparatus as defined in claim 6 further including means for removing said error-indicating signal in response to a selected format of said address signals.

9. Computer-controlled process control apparatus comprising:
   (A) centrally-located process controlling computer means, including
      (1) means for computing information signals for operating individual process control stations, and
      (2) means for developing signals for activating said individual stations to process said information signals,
   (B) a plurality of relatively remotely located process-control stations arranged in at least first and second groups thereof and each of which receives said information signals and operates a process-controlling element in response to information signals applied thereto when it receives selected coded function signals,
   (C) encoding means in circuit with said computer means and said stations and applying function signals to a single group of stations in response to said station-activating signals from said computer means, and
   (D) first and second error-detecting means included in said first and second groups of stations respectively, each of said first and second error-detecting means including
      (1) means for receiving said function signals applied to the station group associated therewith, and
      (2) means for responding to function signals having an invalid code to interrupt the processing of information signals by the stations in the group associated therewith.

10. Apparatus as defined in claim 9
(A) further comprising third error-detecting means responding to the application of function signals to both said station groups coincidentally to disable said encoding means from applying function signals to stations.

11. Automatic process control apparatus comprising
(A) digital computing means having a digital register for storing digital signals,
(B) plural process-controlling means,
(C) digital-to-analog converting means coupled to receive said digital signals from said register and coupled to apply a corresponding analog data signal to said process-controlling means, said process-controlling means including means for processing said analog data signals, and
(D) error-detecting means, including
 (1) first means for receiving a first signal corresponding to said analog data signal applied to said process-controlling means,
 (2) second means for receiving from said digital register said digital signal sent to said digital-to-analog converting means,
 (3) means for developing a second signal as an analog signal responsive to said digital signal from said second receiving means,
 (4) means for comparing said first signal with said second signal, and
 (5) means for developing an error-indicating signal where the resultant of said comparison exceeds a selected value.

12. Apparatus as defined in claim 11 in which said error-detecting means includes counting means connected to produce said error-detecting signal only when the resultant of said comparison exceeds said selected value after a selected number of separate comparisons, thereby to minimize error indications resulting from noise perturbations.

13. Apparatus as defined in claim 11 further comprising means enabling, in response to selection signals from said digital computing means, selected process-controlling means to process data signals applied thereto, said enabling means responding to said error indicating signal to disable said process controlling means from processing said data signals.

14. Apparatus as defined in claim 11 further including
(A) means in said second means for receiving for generating the complement signal of said digital signal sent to said digital-to-analog converting means, and wherein
(B) said second signal corresponds to said complement signal.

15. In a computer-controlled process control system in which computer means services each of several process control devices in sequence, and each process control device stores a signal corresponding to the last data signal it received from the computing means, the improvement of
(A) plural process control devices
 (1) organized in at least two groups each having at least two such devices, and
 (2) each of which is activated to accept information from said computer means when it receives both first and second groups of signals,
(B) computer means, including
 (1) means for developing said first and second groups of signals, with one or more signals per group, where one group of signals identifies a selected process control device and the other group of signals identifies information to be transferred to the selected process control device,
 (2) means for applying said first group of signals to all said process control devices and for applying said second group of signals only to the group of process control devices including said selected device, and
(C) error detecting means including means for developing an error indicating signal in response to any one of
 (1) the application of said second group of signals to more than one group of said process control devices and
 (3) the application of said device-identifying group of signals to any group of said process control devices with an invalid format.

References Cited
UNITED STATES PATENTS

| | | | |
|---|---|---|---|
| 2,740,106 | 3/1956 | Phelps | 340—146.1X |
| 3,082,403 | 3/1963 | Silliman et al. | 340—146.1X |
| 3,234,518 | 2/1966 | Rakoczi | 340—146.1X |
| 3,252,138 | 5/1966 | Young | 340—146.1 |

MALCOLM A. MORRISON, Primary Examiner

C. E. ATKINSON, Assistant Examiner

U.S. Cl. X.R.
340—147, 163

UNITED STATES PATENT OFFICE
CERTIFICATE OF CORRECTION

Patent No. 3,551,885          Dated December 29, 1970

Inventor(s)   Russell A. Henzel

It is certified that error appears in the above-identified patent and that said Letters Patent are hereby corrected as shown below:

Column 9, line 63, "meas" should read -- means --. Column 11, line 36, "error-detecting" should read -- error-indicating --. Column 12, line 34, "(3)" should read -- (2) --.

Signed and sealed this 30th day of May 1972.

(SEAL)
Attest:

EDWARD M. FLETCHER, JR.        ROBERT GOTTSCHALK
Attesting Officer              Commissioner of Patents